United States Patent

[11] 3,568,740

[72] Inventor Leroy M. Speakman
 Rte 1, Troy, Ohio 45373
[21] Appl. No. 794,661
[22] Filed Jan. 28, 1969
[45] Patented Mar. 9, 1971

[54] STUMP CUTTER WITH A SELECTIVELY POSITIONABLE CONTROL CONSOLE
8 Claims, 5 Drawing Figs.

[52] U.S. Cl..................................................... 144/2,
 37/2, 175/219
[51] Int. Cl..................................................... A01g 32/06
[50] Field of Search........................................ 144/2
 —(11), 2 —(21), 3 —(4), 209 —(1); 173/28, 43;
 175/219; 37/2; 143/6—(1), (Inquired)

[56] References Cited
UNITED STATES PATENTS

| | | | |
|---|---|---|---|
| 2,754,087 | 7/1956 | Johnson | 175/219 |
| 2,893,453 | 7/1959 | Brundell et al. | 144/242 |
| 2,912,022 | 11/1959 | VerPloeg et al. | 144/2 |
| 3,104,687 | 9/1963 | Field | 143/6 |
| 3,308,860 | 3/1967 | Shano | 144/2 |
| 3,431,983 | 3/1969 | Jacobson | 173/43 |

*Primary Examiner*—Gerald A. Dost
*Attorney*—Marechal, Biebel, French & Bugg

ABSTRACT: A stump cutter incorporates a portable wheel supported frame having a telescopic tongue, and a carriage is mounted on the frame for lateral movement. An engine is mounted on the carriage for driving a circular cutting disk which is supported by a housing pivotally mounted on the carriage for vertical movement. The movements of the tongue, carriage and cutting disk are effected by corresponding hydraulic cylinders connected by flexible lines to corresponding control valves mounted on a control console. An arm supports the console and is pivotally connected to the frame for movement of the console between a retracted position adjacent the frame and selectable extended positions in laterally spaced relation to the cutting disk.

PATENTED MAR 9 1971 3,568,740

INVENTOR
LEROY M. SPEAKMAN
BY
Marechal, Biebel, French & Bugg
ATTORNEYS

FIG-4
FIG-5
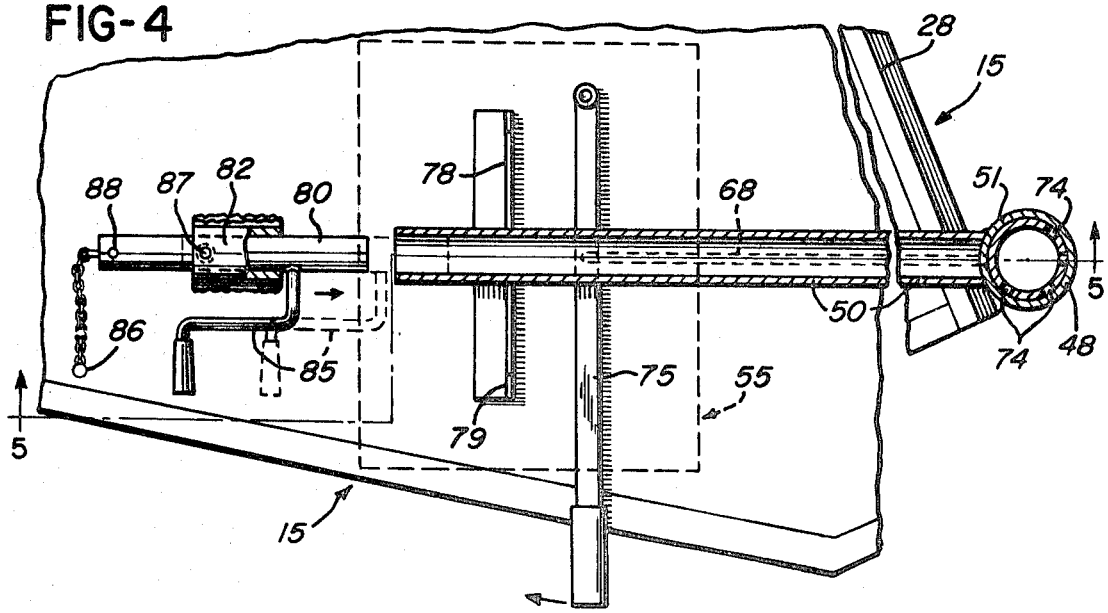
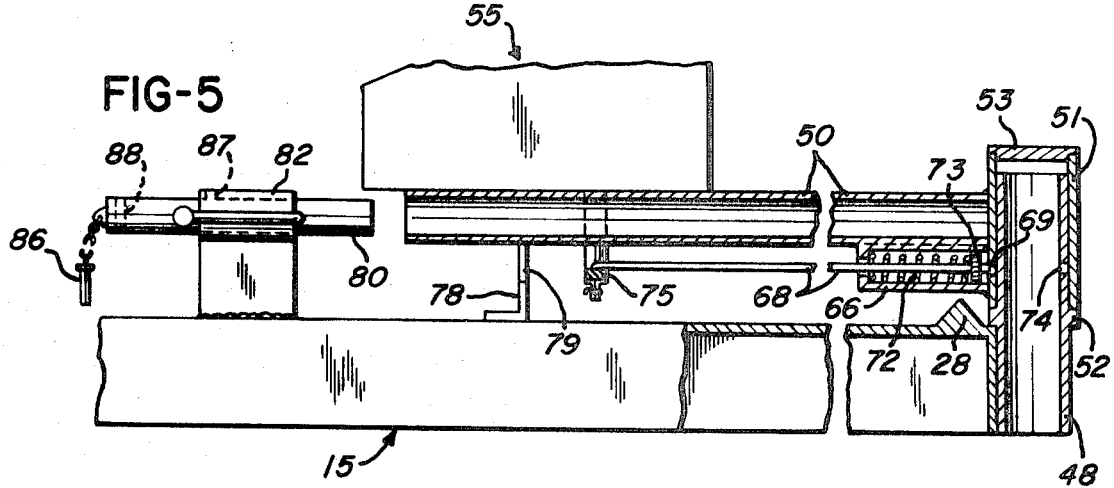

STUMP CUTTER WITH A SELECTIVELY POSITIONABLE CONTROL CONSOLE

BACKGROUND OF THE INVENTION

In a stump cutter of the general type disclosed in U.S. Pat. No. 2,912,022, a portable wheel supported frame includes a telescopic tongue and supports a laterally movable carriage on which is mounted an engine for driving a circular cutting disc supported by a rearwardly projecting housing pivotally mounted on the carriage for vertical movement. Hydraulic cylinders are employed for extending and retracting the tongue and for moving the carriage and the housing to position the cutting disc in relation to the stump, and the cylinders are controlled by corresponding hydraulic valves which are mounted on the frame in front of the path of the carriage.

As a result of the location of the control valves, it has been found difficult to observe the cutting disc in relation to the stump as the position of the cutting disc is adjusted vertically, laterally and longitudinally during the cutting operation. That is, after adjusting the position of the cutting disc, it is necessary for the operator to walk to the rear of the stump cutter to observe the position of the cutting disc on the stump, and when further adjustments are necessary the operator must return to the forwardly located control valves. Thus during a stump removing operation, the operator of the machine is continuously walking back and forth between the forwardly located control valves and the rearwardly projecting cutting disc.

SUMMARY OF THE INVENTION

The present invention is directed to an improved stump cutter of the general type outlined above and which provides for moving the control console including the control valves from a retracted position where the console is located adjacent the frame for towing or storing the stump cutter and an extended position where the control valves are located in laterally spaced relation to the cutting disc so that the operator can conveniently observe the precise position of the cutting disc in relation to the stump during the cutting operation. In addition, the present invention provides for selectively positioning the control valves at one of a plurality of operating stations according to the contour of the ground and the position of the stump cutter relative to the stump.

In accordance with a preferred embodiment of the invention, a control console encloses a series of hydraulic control valves and is supported by an elongated tubular arm which is pivotally connected to a rearward corner of the frame for rotation of the arm on a vertical axis. The control console is normally stored in a retracted position where the support arm extends forwardly over the frame and is locked to the frame. The arm is movable or rotatable to a rearwardly extending position where the control console is spaced laterally or axially of the cutting disc.

A pivotable lever is mounted on the arm adjacent the control console and is connected to a lock rod which extends through the hub of the arm and provides for locking the arm in its rearwardly extending position or in a selected intermediate laterally extending position. A pivotable boom is mounted on the arm and supports flexible hydraulic fluid lines which connect the hydraulic actuating cylinders to the control valves. The boom assures that the lines do not interfere with the travel of the carriage and that the flexing of the lines is minimized when the arm is pivoted.

BRIEF DESCRIPTION OF THE DRAWINGS

FIG. 4 is a fragmentary plan view with portions broken away to show details of construction; and FIG. 5 is a fragmentary section taken generally on the line 5–5 of FIG. 4.

DESCRIPTION OF THE PREFERRED EMBODIMENT

Figure 1:
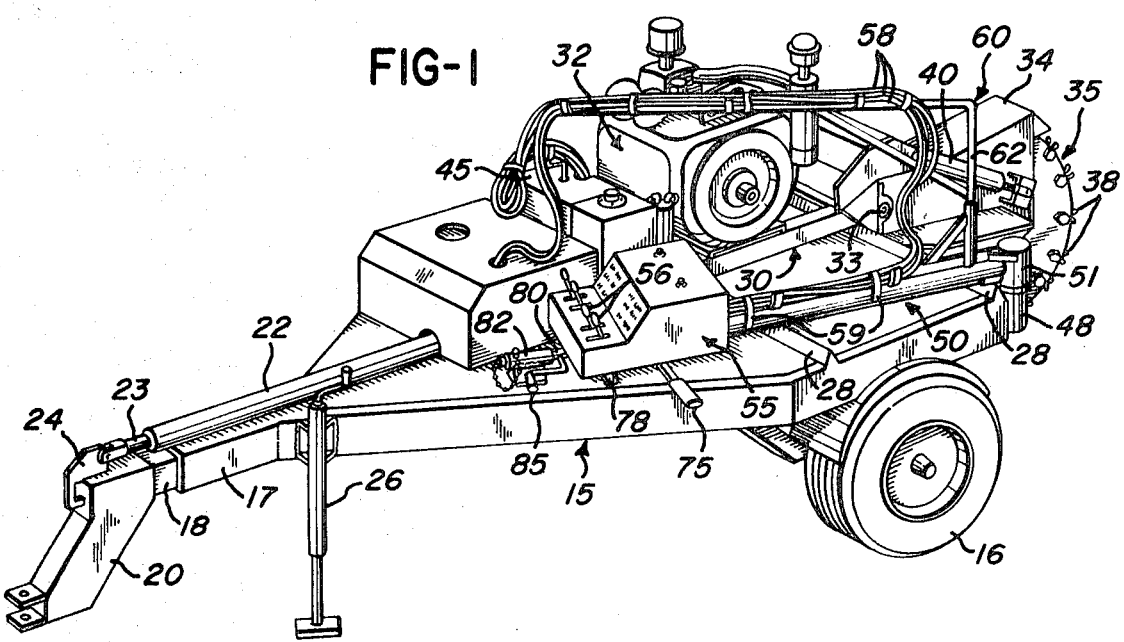
FIG. 1 is a perspective view of a stump cutter incorporating a control console supported in accordance with the invention.

FIG. 1 shows a portable stump cutter which includes a generally flat trailer bed or frame 15 supported by a pair of wheels 16 and having a tubular tongue portion 17 of square cross-sectional configuration. A tongue extension 18 telescopes within the tongue portion 17 and is rigidly connected to a hitch 20 adapted to be attached to a towing vehicle. A double acting hydraulic cylinder 22 is mounted on the tongue portion 17 of the frame 15 and includes a piston rod 23 connected to a bracket 24 secured to the hitch 20 so that actuation of the cylinder 22 is effective to roll the frame 15 in a longitudinal direction relative to a parked vehicle attached to the hitch 20. A screwjack 26 is mounted on the frame 15 for supporting the tongue portion 17 when the hitch 20 is disconnected from the vehicle.

A pair of laterally extending and parallel spaced tracks or guideways 28 are secured to the frame 15 and support a carriage 30 for laterally traversing movement by a hydraulic cylinder (not shown). A gasoline engine 32 is mounted on the carriage 30 and is connected by a belt drive (not shown) to a laterally extending shaft 33 (FIG. 2) which also forms the pivotable support for a vertically movable housing 34.

A vertically positioned circular cutting disc 35 is mounted on a shaft 36 carried by the housing 34 and includes a plurality of peripherally spaced cutting teeth 38. A chain drive (not shown) connects the disc 35 to the shaft 33 so that the engine 32 continues to drive the disc 35 when the housing 34 is adjusted vertically in response to actuation of a double acting hydraulic cylinder 40 connecting the housing 34 to a bracket 41 mounted on the carriage 30. A hydraulic pump (not shown) is mounted on the carriage 30 and is also driven by the engine 32. Flexible fluid lines (not shown) connect the pump to a hydraulic fluid reservoir 45 mounted on the frame 15.

In accordance with the present invention, a vertically extending tubular shaft 48 is rigidly secured to the left rear corner of the frame 15 and supports a horizontally extending boomlike tubular arm 50 which is rigidly secured to a cylindrical sleevelike hub 51 mounted for rotation on the upper portion of the shaft 48 adjacent a peripheral support flange 52. A circular cap 53 is removably mounted on the hub 51. A boxlike control console 55 is mounted on the free end of the arm 50 and includes a plurality of hydraulic valves having corresponding actuating levers 56.

A series of flexible hydraulic lines 58 connect the lever actuated valves to the hydraulic pump mounted on the carriage 30 and to the corresponding hydraulic cylinders 22 and 40 along with the hydraulic cylinder for moving the carriage 30. The hydraulic lines 58 are attached to the arm 50 by a plurality of clamps 59 and are supported above the path of the carriage 30 by an L-shaped boom 60 having a vertically extending leg 62 supported for rotation within a vertical tube 63 mounted on the arm 50 adjacent the hub 51.

A tubular housing 66 is secured to the underneath surface of the arm 50 adjacent the hub 51 and receives a longitudinally extending rod 68 having an inner end portion which projects into a hole 69 formed within the hub 51. A compression spring 72 is positioned within the housing 66 and engages a collar 73 mounted on the rod 68 for urging the inner end portion of the rod into one of a series of angularly arranged holes 74 formed within the shaft 48 to form a lock between the hub 51 and the shaft 48. The outer end portion of the rod 68 is connected to a lever 75 pivotally connected to the underneath surface of the control console 55.

Figure 2:
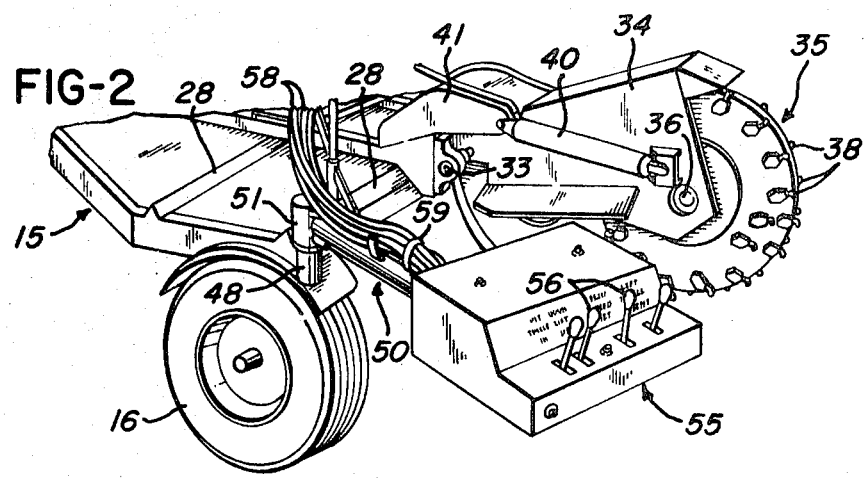
FIG. 2 is a fragmentary perspective view of the rearward portion of the stump cutter shown in FIG. 1 and showing the control console moved to a rearwardly extended position.

By pivoting the lever 75 away from the hub 51, the inner end portion of the rod 68 is retracted from the shaft 48 so that the arm 50 is free to swing to move the control console 55 between a retracted position (FIGS. 1 and 3) and a rearwardly extended position where the control console is spaced laterally or axially from the cutting disc 35. When the lever 75 is released, the control rod 68 extends into the corresponding hole 74 thereby locking the arm 50 in its rearwardly extended position (FIG. 2).

Each of the other holes 74 (FIG. 4) formed within the shaft 48 enables the control console 55 to be positively located in another extended position according to the contour of the ground adjacent the stump to be removed. For example, when the stump is located at the top of the hill, it is sometimes desirable to position the control console 55 laterally outwardly from the adjacent wheel 16 with the arm 50 extending substantially parallel to the axis of the wheel 16.

Figure 3:
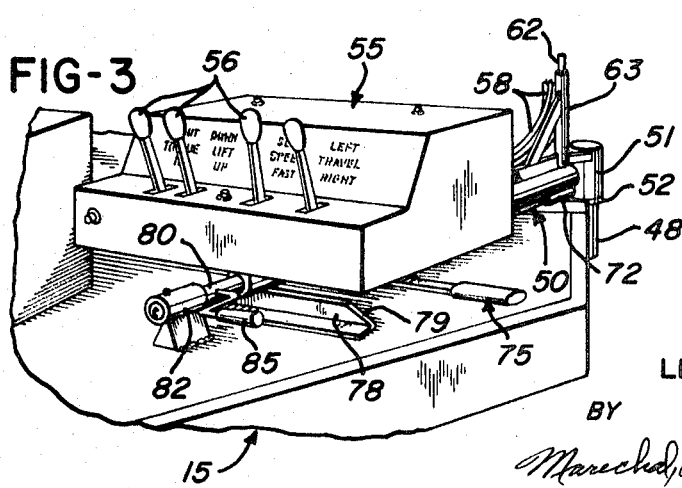
FIG. 3 is a fragmentary perspective view of the stump cutter of FIG. 1, showing the control console in a retracted position.

Referring to FIGS. 3—5, when the control console 55 is located in its retracted position for storage or towing of the stump cutter, the free end portion of the cantilevered arm 50 rests upon a bracket 78 mounted on the frame 15. The bracket 78 has a tapered end surface 79 which helps guide the arm 50 onto the bracket. A cylindrical lock bolt 80 is supported by a tubular bearing 82 mounted on the frame 15, and a crank-shaped handle 85 is connected to the lock bolt 80 for manually shifting the lock bolt 80 between a released position (FIGS. 4 and 5) and a locked position (FIG. 3) where the rearward end portion of the lock bolt 80 projects into the forward end portion of the tubular arm 50. A pin 86 is carried by the lock bolt 80 and is inserted into aligned holes 87 and 88 (FIG. 4) within the bearing 82 and lock bolt 80, respectively, for securing the lock bolt after it is shifted to its locked position.

From the drawings and the above description, it is apparent that a stump cutter constructed in accordance with the present invention provides desirable features and advantages. For example, the support of the control console 55 by the pivotable arm 50 provides for conveniently moving the control console between a retracted position overlying the frame 15 and a rearwardly extended position where the console 55 is cantileveredly supported in laterally spaced relation to the cutter disc 35. In this rearwardly extended position, it has been found that an operator standing adjacent the control console 55 is located out of the path of flying chips which are discharged from the cutting disc 35, but can conveniently view the cutting disc 35 and its position relative to the stump. Thus the operator can precisely position the cutting disc 35 either vertically, laterally or longitudinally for obtaining the most effective cutting operation.

Another important feature is provided by the lock rod 68 which can be conveniently operated by the lever 75 for positively securing the arm 50 in either the rearwardly extending position (FIG. 2) or one of the laterally extending positions corresponding to the holes 74 within the shaft 48. That is, the lock system assures that the arm 50 will not swing or move from a selected position during operation of the stump cutter. Furthermore, the arm 50 and control console 55 can be conveniently locked in their retracted positions simply by extending the lock bolt 80 (FIG. 4) into the free end portion of the arm 50. The pivotable boom 60 not only supports the hydraulic lines 58 above the path of the carriage 30 but also assures that the flexing of the hydraulic lines 58 is minimized during movement of the arm 50 and control console 55.

While the form of apparatus herein described constitutes a preferred embodiment of the invention, it is to be understood that the invention is not limited to this precise form of apparatus, and that changes may be made therein without departing from the scope and spirit of the invention.

I claim:

1. An improved stump cutter comprising a wheel supported frame including forwardly projecting tongue means for towing, a carriage mounted on said frame for generally lateral movement, a cutting member positioned rearwardly of said frame, means mounted on said carriage and supporting said cutting member for generally vertical movement relative to said frame, power drive means mounted on said carriage and connected to drive said cutting member, fluid actuated means for moving said carriage and said cutting member, a generally horizontally extending support arm positioned adjacent one side of said frame, pivot means mounted on the rearward portion of said frame adjacent said one side and cantileveredly supporting said arm for rotation on a generally vertical axis, a control console mounted on the outer end of said arm and including a set of fluid control valves, flexible fluid lines connecting said valves to said fluid actuated means, and said pivot means supporting said arm and said console for movement between a forwardly projecting retracted position generally overlying said frame to facilitate towing and storing said cutter and a rearwardly extending operating position in laterally spaced relation to said cutting member and through a laterally extending operating position to provide for conveniently and safely viewing said cutting member in relation to the stump while actuating said control valves.

2. A stump cutter as defined in claim 1 including means mounted on said frame and engageable with said outer end of said arm in said retracted position for locking said arm in said retracted position.

3. A stump cutter as defined in claim 2 wherein said arm includes a tubular end portion, and said locking means comprise a lock member movable between a released position and a locked position received within said end portion of said arm.

4. A stump cutter as defined in claim 1 wherein said arm is pivotable through approximately 180° for moving said console between said retracted position adjacent said frame and said rearwardly extending operating position spaced rearwardly of said frame.

5. A stump cutter as defined in claim 4 including means mounted on said frame for supporting said outer end of said arm in said retracted position.

6. A stump cutter as defined in claim 1 including means connected to said arm for supporting said fluid lines above the lateral path of said carriage.

7. A stump cutter as defined in claim 6 wherein said supporting means for said fluid lines comprise an L-shaped boom having a downwardly projecting leg mounted on said arm for rotation on a generally vertical axis.

8. A stump cutter as defined in claim 1 including lock means for positively securing said arm in said extended positions, and handle means adjacent said console for actuating said lock means for conveniently and selectively locating said console according to the contour of the land adjacent the stump and the position of the cutter in relation to the stump.